Sept. 26, 1950      H. C. SCHUTT      2,523,971
THERMAL PROCESSING APPARATUS
Filed Nov. 30, 1946      2 Sheets-Sheet 1

INVENTOR
Herman C. Schutt
BY Morgan, Finnegan & Durham
ATTORNEYS

Sept. 26, 1950  H. C. SCHUTT  2,523,971
THERMAL PROCESSING APPARATUS
Filed Nov. 30, 1946  2 Sheets-Sheet 2

INVENTOR:
Herman C. Schutt,
BY
Morgan, Finnegan & Durham
ATTORNEYS.

Patented Sept. 26, 1950

2,523,971

UNITED STATES PATENT OFFICE 2,523,971

THERMAL PROCESSING APPARATUS

Hermann C. Schutt, Framingham Center, Mass., assignor to Stone & Webster Engineering Corporation, Boston, Mass., a corporation of Massachusetts Application November 30, 1946, Serial No. 713,378

5 Claims. (Cl. 196—116)

This invention relates to the thermal processing of fluid organic substances including hydrocarbon liquids, gases and the like and relates more particularly to the high temperature pyrolysis of such substances to effect a desired molecular change or conversion.

An object of this invention is to provide a new, useful and improved method and apparatus for the high temperature treatment of fluid organic substances, hydrocarbon materials in particular.

Another object of this invention is to effect and maintain the most desirable and advantageous temperature gradient and heat intensity distribution in the thermal treatment of such fluid organic substances through the provision of a new and improved pyrolysis furnace for the thermal processing of organic substances which will enable a more selective application of heat to the tube elements thereof.

Another object of this invention is to enable the obtainment of improved yields of desired products from the substances processed, for example, low molecular weight olefins from higher molecular weight hydrocarbons, through the provision of a new and improved pyrolysis furnace for the thermal treatment of fluid organic substances offering a more flexible control of the temperature gradient of the substance under treatment through the whole heating coil.

Another object of this invention is to provide a new and improved pyrolysis furnace for the thermal treatment of organic materials which will offer more efficient heat transfer through the provision of countercurrency of flow between heat absorbing and heat releasing media while at the same time imparting heat and effecting a specific heat intensity distribution in a manner which will effect and sustain the desired temperatures and reactions of the materials in process.

Another object of this invention is to provide a new and improved pyrolysis furnace for heating fluid organic substances to high temperatures in which the tube fittings, such as the return bends, headers and the like in the high temperature zone, being of special alloys, are maintained at the proper temperatures at which the alloy material is stable or self-annealing and are not subjected to intense radiation causing embrittlement of the metals employed.

Another object of this invention is to ensure, in a pyrolysis furnace for the thermal treatment of organic substances, structural stability of the refractory of a heat reflecting refractory arch exposed to high temperatures and the maintenance of a high operating economy, through the provision of a novel directionally reflecting refractory arch enabling a novel form of heat recovery.

Other and further objects of this invention will appear from the following description, the accompanying drawings and the appended claims.

In the accompanying drawings which form part of the instant specification and are to be read in conjunction therewith and in which like numbers refer to like parts throughout the several views:

Figure 1 is a view in sectional elevation of a typical and illustrative embodiment of a pyrolysis furnace in accordance with this invention;

Figure 4 is a fragmentary view in sectional elevation of a modified form of the directional arch in accordance with this invention.

Figure 2:
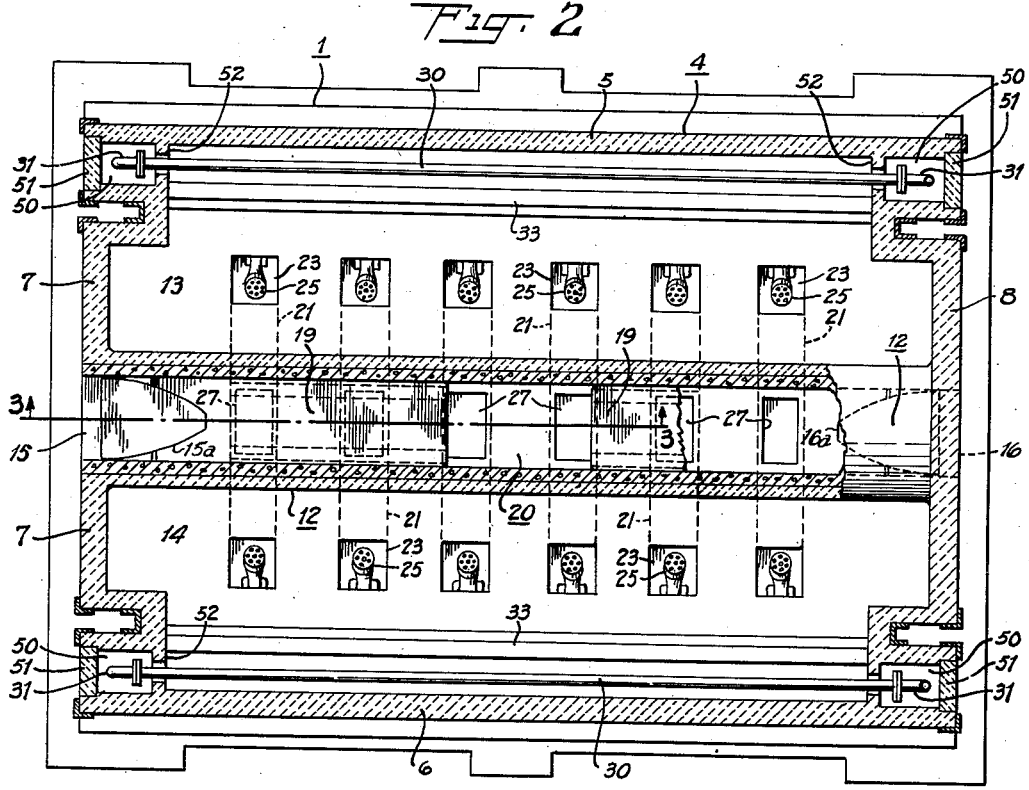
Figure 2 is a plan view in section taken along the line 2—2 of Figure 1.

In general, in accordance with the invention, the material in process in its passage through the heating coil of the furnace as a whole passes first through a convection heating bank, in a flue gas passage, in one or two parallel streams, then through separate radiant heating banks, in the combustion chamber, in two separate streams, the terminal section of each radiant bank forming a time or reaction section wherein the heat absorption rate is reduced. Moreover, in order to reduce the flue gas temperature, lessen the heat intensity on the front rows of tubes of the convection heating bank and thereby provide another means of influencing the temperature gradient of the material in process through the whole conversion coil, a shield bank is interposed between the convection bank in the flue gas passage and the radiant banks in the combustion chamber proper. The provision of the shield bank is advantageous in that it enables the establishment of a lower transfer temperature between the convection and radiant banks which has proved to be highly advantageous in many organic thermal treating reactions and trends, to cite an example, to improve yields of olefins from certain light hydrocarbons. Moreover, the shield bank as a means of influencing the temperature gradient of the material in process through the coil as a whole is advantageous especially in that through it a rapid temperature rise may be effected through a temperature range where conversion can and will take place but is not as desirable as at a higher temperature most favorable to the specific molecular transformation to be achieved.

In accordance with this invention, moreover, the pyrolysis furnace for the high temperature treatment of fluid organic substances has in its combustion chamber, substantially midway between its sidewalls, a hollow directional arch for directionally radiating heat to the charge carrying tube elements of a pair of high temperature radiant heating banks disposed on the respective sidewalls of the furnace, so as to effect a specific heat intensity distribution to said tube elements. For this purpose, the arch, which rises from the furnace floor, has its outer emission or radiation surface formed of suitable refractory material, the surface at each side of the arch curving outwardly away from the opposing sidewall of the furnace at a rate determined by the number and spacing of the wall tubes to benefit by the radiation. Each sidewall tube element of the radiant heating banks is therefore in finite relation to a specific point on the arch curve having regard to the fact that radiation may be figured as perpendicular to the emission surface.

In accordance with this invention also, the outer emission surface of the directional arch is exposed to flame in such fashion as to receive intense heat by surface combustion and by hot flue gas convection and in turn to radiate intense heat directionally to the wall tubes of the high temperature heating section where rapid rise in temperature is desired and cannot be achieved merely by gas black body radiation because of the normal flue gas temperature gradient. For this purpose, therefore, burners adjustable as to flame length and direction are disposed to project their flame toward the sides of the directional arch from openings in the furnace floor and to bathe the curved emission surface of the arch in flame. In consequence, black body surface combustion is promoted over the whole curved emission surface to the top of the arch the same being manifested by the tendency of the flame to adhere to the curved surface whose curvature it follows to an appreciable extent.

Air for the burners is preferably taken in through the hollow interior of the directional arch thereby utilizing the combustion air for cooling the inner face of the arch and its bricks and/or other supporting structure and for recovering the normal and necessary heat flow through the arch and using the recovered heat for obtaining high combustion or flame temperatures.

Also in accordance with the invention, the tube elements located on the furnace sidewalls at opposite sides of the directional arch and in spaced relation thereto lie outside of the main path of travel of the flames and hot combustion gases but are exposed to heating by direct radiation from the flames and the hot combustion gases and by the directional radiation from the curved radiation or emission surfaces of the directional arch. The curved faces of the arch are designed to effect a specific heat intensity distribution to the middle and upper sections of each bank of radiant wall tubes where high heat input is desirable for effecting a rapid temperature rise and for supplying the heat of cracking for the already progressing conversion. Hence, through the provision of the proper curvature of the arch faces, a desired temperature gradient in the heating of the charge or reactant coursing through the wall tubes, is capable of being attained.

In accordance with this invention, also additional or supplemental radiant heated tubes are provided adjacent each side wall wherein the charge or reactant may be maintained at the appropriate conversion temperature and wherein the heat absorption rate is reduced by shielding in accordance with the cracking heat requirements as the conversion progresses to a degree set for the conversion process. To this end, therefore, one or more rows of tubes forming a time or reaction bank are disposed between each side wall and shield wall means of refractory material, which may be solid or of checkered design and will enable the desired reduced rate of heat absorption by the reactant in this section. Normally, as the conversion progresses, the heat of reaction decreases and the heat absorption rate should be controlled accordingly to avoid temperature rise detrimental to the process. Hence, the shield wall may be of such height and construction as dictated by characteristics of the conversion process as will insure that the heat absorption rate will be reduced by the shield wall means in accordance with the cracking heat requirements as the conversion progresses to a degree set for the conversion process.

Also in accordance with this invention, the terminal fittings of the radiantly heated tube elements are contained in annealing chambers disposed in the furnace end walls and communicating with the combustion chamber. The interconnection between the annealing chambers and the radiant or combustion chamber is designed as to admit the desirable amount of combustion gas to bathe the fittings in hot fluid and thereby maintain their outer surfaces at an elevated temperature at which the steel or alloy materials of the return bends, welded joints, castings and the like, are stable or self-annealing. However, the welded junctions of the tubes and fittings are shielded from direct and intense radiant heat to avoid a degree of heat absorption at this point and, consequently a temperature gradient through the metal which may set up inter-fibre stresses leading to failures of castings or welded junctions. It will be understood that cast high chrome nickel alloys though excellent materials for very high temperatures, for example, in the order of 1500° F., show embrittlement below around 1200° F., and that through the provision of the annealing chambers, the surface temperatures of the fittings may be maintained at a favorable temperature preventing such embrittlement yet avoiding intense heat absorption and high temperatures detrimental to such materials.

Figure 3:
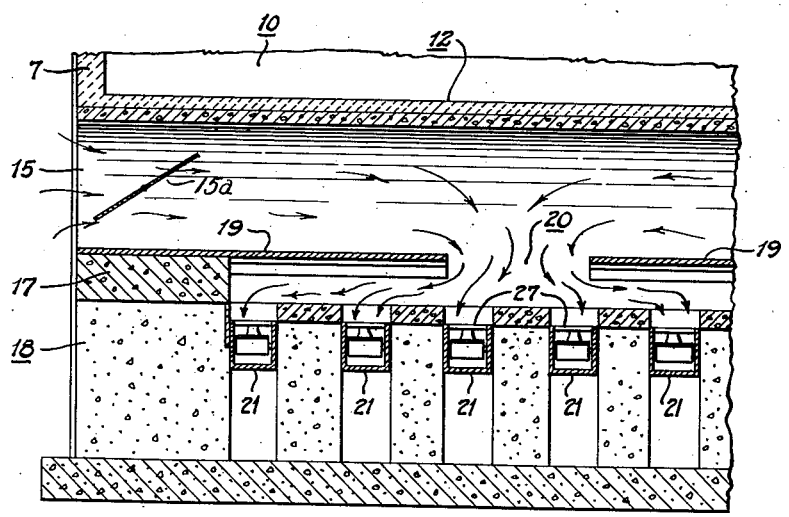
Figure 3 is a partial or fragmentary view in sectional elevation taken along the line 3—3 of Figure 2.

Referring now more particularly to Figures 1 to 3 of the accompanying drawings, a furnace setting 1 having longitudinally disposed sub-floor passages 2 and 3 provides a foundation or support for a furnace 4 having oppositely disposed refractory vertical side walls 5 and 6 and refractory vertical front and rear end walls 7 and 8, respectively. The side walls 5 and 6 as here preferably embodied are converged upwardly inwardly at their top portions to connect with a substantially horizontally disposed flue gas passageway 9 through which products of combustion generated in the combustion chamber 10 flow to a stack (not shown).

The combustion chamber 10 is preferably longitudinally divided substantially centrally thereof by a hollow directional arch 12 faced with refractory material, the arch providing a pair of separate combustion sections 13 and 14 at opposite sides thereof between it and the side walls 5 and 6 respectively. In accordance with the embodiment shown in Figures 1 to 3, the arch 12 terminates at its ends in the respective end walls 7 and 8 which are apertured at the arch terminii to provide combustion air inlet openings 15 and 16 which may be equipped with dampers 15a and 16a, respectively. Each end of the directional arch 12 is preferably provided with a structural floor section 17 extending inwardly a short distance from the end walls 7 and 8 respectively, the floor sections 17 being supported on a central longitudinal footing 18 of the furnace setting. The floor sections 17 carry a complementary partition flooring sections 19 extending from the damper controlled air inlet openings 15 and 16 toward each other longitudinally of the arch and terminating in spaced relation to each other to provide an opening 20 through which heated air for combustion is adapted to flow to the burners.

To this end, the footing 18 may carry a plurality of parallel air ducts 21 disposed beneath the setting floor 22, these ducts extending in opposite directions from the footing 18 toward the furnace sidewalls and opening respectively at their opposite ends in burner openings 23 located in the floor 24 of the furnace 4 thereby to provide a row of burner openings at each side of the arch 12. Each opening is provided with a burner 25 adjustable as to flame length and direction, supported by and in angularly adjustable relation to a burner mounting diagrammatically shown at 26 through which primary air and fuel are admitted to the burner in regulated quantities. Heated secondary air is admitted to the ducts 21 through inlet openings 27 centrally disposed in each duct below the flooring partitions 19 and supplied with heated air from the arch opening 20. Dampers 21a and 21b may be provided in the right and left arms of each duct for controlling the air flow to the burners supplied thereby.

A radiant tube bank is disposed along each of the side walls 5 and 6 of the furnace in the form of parallel rows of horizontally disposed tubes 30, the tubes of each bank being connected at their ends, preferably for series flow, by means of headers or return bends 31. In order to effect a specific heat intensity distribution to the middle and upper sections of each bank of radiant wall tubes 30 where high heat input to the material in process is desirable, the directional arch 12 is provided with the curved side faces 32, the faces 32 being precisely contoured to obtain the necessary specific heat intensity distribution for the desired cracking heat requirements in the radiant tube bank as the conversion progresses. This curvature will be in finite relation to the number and spacing of the tubes 30 to which the arch is to radiate having regard to the assumption that radiation is perpendicular to the arch surface. This relationship of tube numbers and spacing to the arch contour is diagrammatically indicated in Figure 1 by the dotted radiation lines R.

The lower section of each bank of radiant wall tubes 30 forms a time reaction section which is shielded from the direct radiation of the combustion gases, flame and arch 12 by means of a shield wall 33 which is disposed in front of the tubes 30 forming this section and may be thicker at the bottom than at the top to reduce further the heat absorption rate in the tubes 30 of the reaction section in accordance with the cracking heat requirements as the conversion progresses to a degree set for the overall crack per pass. This time reaction section may embody one or more rows of the tubes 30 and as here preferably embodied comprises two vertical rows or banks of tubes, disposed one row behind the other, between the shield 33 and the furnace side wall 5 or 6 as the case may be. To this end, the side walls 5 and 6 may be outwardly offset in the region opposite the reflecting arch to provide the requisite space for accommodating the tubes of the time reaction section.

A bank of convection heated tubes is disposed in the flue gas passageway 9, the bank as here preferably embodied being divided into separate sections 34 and 35 each having serially connected tubes and each section being adapted to be supplied separately with fluid by means of the diagrammatically indicated fluid feed lines 36 and 37, respectively. The outlets of tube sections 34 and 35 are separately connected to the inlets of the right and left-hand banks respectively of radiantly heated wall tubes 30 by diagrammatically indicated pipes 38 and 39, respectively. Processed fluid is adapted to be discharged in separate streams from the shielded time reaction sections of the radiant wall banks through the diagrammatically indicated separate outlet pipes 40 and 41 respectively.

A separate convectively heated shield bank of fluid conducting tubes is disposed in the flue gas passage 9 between the convection heated tube bank therein and the combustion chamber 10. This shield bank as here preferably embodied comprises a number of rows of serially connected tube elements 45 and is preferably supplied with steam via the diagrammatically indicated pipe 46, the steam being superheated therein and on discharge therefrom may be conducted by the diagrammatically indicated pipe 47 to the feed lines 36 and 37, through separate branches. This shield bank serves to reduce the flue gas temperatures, lessen the heat intensity on the front rows of tubes of the convection heating sections 34 and 35 and provides another means of influencing the temperature gradient of the reactant through the whole coil.

The terminal fittings of the radiant wall tubes 30 are preferably disposed in header boxes or annealing compartments 50 having the respective access doors 51 by which access from the furnace exterior to the fittings 31 for removal, cleaning, repair and replacement may be had. Each of the compartments 50 as here preferably embodied is disposed outside of the combustion chamber 10 proper but preferably within the regular confines of the furnace proper. The front wall 52 of each compartment through which the tubes 30 pass in spaced relation thereto forms a vented shield which while preventing direct application of intense radiant heat to the welded junctions of the tubes and header fittings and castings and resultant excessive heat absorption at these points, nevertheless, permits the establishment of a temperature gradient through the metal of the fittings which will avoid the setting up of inter-fibre stresses in the fittings leading to failures of castings or welded joints. The circumferential spacing between the tubes 30 and the shield panels 52 provides communication between the header boxes and the combustion chamber 10 for the entry of hot combustion gases to maintain the header boxes at an elevated temperature at which the steel or alloys of the return fittings are stable or self annealing and embrittlement of cast high chrome-nickel alloy fittings is avoided.

A modified form of directional arch structure is depicted in Figure 4 wherein the ends of the arch are closed and air for the burners 25 and cooling air for the arch structure is supplied to the interior of the arch 12 for preheating through a duct 60 which extends upwardly through the setting floor 22 to a substantial heighth within the interior of the arch. The inlet opening of the duct is preferably supplied with a damper 61 for controlling the air flow and the duct is supported within the arch by suitable structural framework 62 which may be suitably anchored to the supporting internal brickwork 63 of the arch. The setting floor 22 is preferably recessed beneath the arch 12 and for a short distance to each side to form with the furnace floor 24 an air duct 64 leading to a circumferentially apertured muffle 65 surrounding the burner 25 in each burner opening 23. It will be understood that the air duct 64 need not be continuous but may be of the manifold type with separate branches leading to the respective muffles 65.

In the thermal treatment of fluid organic substances in accordance with the apparatus shown in Figure 1, the material to be processed, for example, a light gas oil or naphtha feedstock, may be supplied in separate parallel streams under pressure via the feed lines 36 and 37 to the respective inlets of the convection sections 34 and 35. The reactant in flowing through these sections is gradually heated, at a relatively low rate, mainly by convection heat of the flue gases flowing through the flue gas passage 9, to a relatively low initial temperature from which the reactant upon transfer to the radiant heating banks is to be rapidly raised to a temperature, e. g. 1300–1500° F., at which the desired main conversion reaction is to take place. This low initial or transfer temperature is made possible through the provision of the shield bank tubes 45 which may be supplied with steam for superheating or with other fluid through the supply line 46 and from which the heated fluid may be removed from the system through the discharge line 47. The heat thus recovered in the fluid may be used, if desired, elsewhere than in the carrying out of the process of this invention but is preferably supplied as superheated steam to the charge material entering the system through the feed lines 36 and 37.

The reactant leaving the convection sections 34 and 35 at the desired low transfer temperature is conducted by the lines 38 and 39 to the topmost of the serially connected radiant tubes 30 of the right and left radiant banks in the combustion chamber 10 where the reactant is rapidly heated to a high temperature most favorable to the specific molecular transformation to be achieved. This rapid heating through a temperature range where conversion can and will take place but is not as desirable as at a higher temperature is made possible through the provision of the shield bank and through the provision of the novel arch 12, whose curved faces are so designed as to effect a specific heat intensity distribution and intense heat radiation to the middle and upper sections of each bank of radiant wall tubes where high heat input is desirable for effecting a rapid temperature rise and for supplying the heat of cracking for the already progressing conversion. The intensity of the radiation from the arch 12 to the tubes 30 is controllable by suitable adjustment of the length and direction of the flame sweeping the emission surface 32 of the arch from the burners 25 to which air for combustion entering the interior of the arch through the end openings 15 and 16, Figure 2 or through the duct or ducts 60, Figure 4, is supplied in a heated state consequent upon the absorption by the entering air of the normal heat loss through the arch structure. Thus, the arch structure is protected against injury from excessive internal temperatures and the preheated air enables the attainment of a higher flame temperature.

In the lower section of the bank of radiant tubes 30 the reactant, in series flow therethrough, is maintained at the desired conversion for a time necessary to complete the reaction. Radiant heat is supplied to each time reaction section by the related shield wall 33, the rate of heat input being reduced measurably from that in the middle and upper sections of the radiant banks since the heat of reaction normally decreases as the conversion proceeds and the heat absorption rate is controlled accordingly to avoid temperature rise detrimental to the degree of conversion set for the conversion process. The progressively increasing thickness of the shield walls 33 enables the reduction in heat input to be attained in accordance with this object and the processed fluid is removed from the system through the discharge lines 40 and 41 for such other and further treatment as may be required. In all cases, however, the terminal fittings of the tubes 30 are maintained at a stable or annealing temperature through the novel provision of the vented annealing compartments 50.

It will be understood that although separate streams of fluid are shown as being supplied to the convection sections 34 and 35, these sections may be combined into a single bank from which the fluid may flow in separate streams to the respective radiant banks. It is apparent also that different fluids may be processed simultaneously in parallel streams in the respective banks of the apparatus to which the heat input may be established in accordance with the conversion heat requirements by suitable configuration of the emission surface of the arch and by control of the burner output.

It will be understood that certain features and sub-combinations are of utility and may be employed without reference to other features and sub-combinations. This is contemplated by and is within the scope of the appended claims. It is further obvious that various changes may be made in details within the scope of the appended claims without departing from the spirit of this invention. It is, therefore, to be understood that this invention is not to be limited to the specific details shown and described.

What is claimed is:

1. A furnace for the heating and processing of fluids, comprising, in combination, floor, side and end walls defining a lower portion of the furnace; a bank of tube elements disposed adjacent each of said side walls; a hollow reflecting arch extending between said end walls and disposed centrally in relation to said side walls for directionally radiating heat to the respective banks, said arch having an opening for admitting air thereinto and having curved emission surfaces, each curving outwardly away from its opposing side wall so as to effect a specific heat intensity distribution and intense heat radiation to the upper and middle portions of the respective banks; firing ports disposed in said floor on opposite sides of said arch; burners communicating with said firing ports for directing combustible fuel mixtures against the curved faces of said arch, said burners being adjustable as to flame length and direction so as to bathe said faces in flame; and, conduits for conducting heated air from the interior of said arch to said firing ports.

2. A furnace for the thermal processing of fluids comprising means forming a flue gas passageway and a combustion chamber, a convection bank and a radiant bank, disposed in the flue gas passageway and the combustion chamber, respectively, of said furnace for heating mainly by convection heat and radiant heat, respectively, said radiant bank including lower, middle, and upper sections; a shield bank disposed between said convection bank and said radiant bank in said flue gas passageway for controlling fluid transfer temperature between said banks; a hollow reflecting arch in the combustion chamber of said furnace for directionally radiating heat to said radiant bank, said arch having provision for admitting cooling air to be heated thereinto and having additionally a curved emission surface curving outwardly away from said radiant bank so as to effect a specific heat intensity distribution and radiate intense heat to the upper and middle sections of said radiant bank, the curvature of said surface being in a finite relation to the number and spacing of the tube elements of said upper and middle sections to benefit by said radiation; shield wall means disposed in said combustion chamber between the lower section of said radiant bank and said arch for reducing heat absorption by said lower section from said arch to a rate lower than that of said upper and middle sections; burner means for directing combustible fuel mixtures against said curved emission surface, said burner means being adjustable as to flame length and direction so as to bathe said surface in flame; and, means for supplying said burner means with heated air from the interior of said arch.

3. A furnace for the heating and processing of fluids comprising, in combination, side and end walls defining the lower portion of the furnace; means disposed above said lower portion forming a flue gas passage of smaller cross-sectional area than said lower portion; sloping walls disposed above the side walls of said lower portion of the furnace and connecting the latter with said flue gas passage; fluid conduits disposed adjacent each of said side walls and said sloping walls, forming separate radiant heating banks on opposite sides of said furnace; fluid conduits in said flue gas passage forming separate convective heating banks each connected to one of said radiant banks; other fluid conduits in said flue gas passage between said radiant banks and said convection banks forming a shield bank for said convective heating banks; a hollow reflecting arch extending between said end walls and disposed centrally in relation to said side walls for directionally radiating heat to said radiant banks, said arch having curved faces disposed in opposition to said radiant heating banks and curving outwardly away from said side walls and said sloping walls so as to effect a specific heat intensity distribution and radiate intense heat to the upper and middle sections of the respective radiant banks and said arch having additionally air inlet openings for admitting air thereinto; a floor having firing ports disposed at opposite sides of said arch; burners communicating with said firing ports for directing combustible fuel mixtures upwardly along the curved faces of said arch, said burners being adjustable as to flame length and direction so as to bathe said faces in flame; and, conduits beneath said floor for conducting heated air from the interior of said arch to said firing ports.

4. A furnace for the heating and processing of fluids comprising, in combination, side and end walls defining the lower portion of the furnace; an open ended, hollow reflecting arch extending between and through said end walls and disposed centrally in relation to said side walls, said arch having provision for the admission of air into its hollow interior through said end walls and having curved surface portions; a shield wall substantially paralleling each side wall in spaced relation thereto; means forming an elongated flue gas passage having its inlet opening disposed above said arch and centrally in relation to said side walls; sloping walls connecting said side walls to said means at said opening; a floor having a plurality of firing ports at opposite sides of said arch, burners communicating with said ports for directing combustible fuel mixtures upwardly along said curved surface portions of said arch, said burners being adjustable as to flame length and direction; conduit means for supplying heated air from the interior of said arch to said burners; fluid conduits in said flue gas passageway forming convection heating banks disposed successively therealong; and, fluid conduits disposed adjacent each of said side walls and sloping walls outside of the main path of travel of flames and hot combustion gases produced by said burners, and between said side walls and shield walls, forming radiant heating banks adapted to receive radiant heat emitted from said arch, the curved surface portions of said arch being so designed as to effect a specific heat intensity distribution and intense heat radiation to the fluid conduits disposed adjacent said side walls and said sloping walls.

5. A furnace for heating and processing fluids comprising, in combination, means including side walls and a floor forming a combustion chamber; a hollow reflecting arch dividing said chamber into a pair of combustion zones, said arch having curved faces disposed in opposition to said side walls, being open at its ends for the controlled admission of cooling air thereinto and having a horizontal partition apertured to provide an outlet for the eduction of heated air; separate conduits disposed beneath said floor having their respective inlet openings communicating with said aperture, separately controllable dampers in said conduits; firing ports in said floor on opposite sides of said arch; burners communicating with said ports for directing combustible fuel mixtures against said curved faces, said burners being adjustable as to flame length and direction and separately communicating with the respective conduits; and, fluid conduits disposed adjacent said side walls outside of the main path of travel of flames and hot combustion gases produced by said burners, for absorbing heat radiated from said curved faces in proportioned amounts, said curved faces being so designed as to effect a specific heat intensity distribution and radiate intense heat to the fluid conduits disposed adjacent the upper and middle portions of said side walls.

HERMANN C. SCHUTT.

(References on following page)

REFERENCES CITED

The following references are of record in the file of this patent:

UNITED STATES PATENTS

| Number | Name | Date |
|---|---|---|
| 1,301,863 | MacDonald | Apr. 29, 1919 |
| 1,881,286 | Mekler | Oct. 4, 1932 |
| 1,908,103 | Barnes | May 9, 1933 |
| 1,958,732 | Wallis | May 15, 1934 |
| 1,971,925 | Watson | Aug. 28, 1934 |
| 1,990,962 | Thorson | Feb. 12, 1935 |
| 2,042,058 | Jefferson | May 26, 1936 |
| 2,079,191 | Thomas | May 4, 1937 |
| 2,111,380 | Barnes | Mar. 15, 1938 |
| 2,123,799 | Podbielniak | July 12, 1938 |
| 2,275,412 | Becker | Mar. 10, 1942 |
| 2,361,812 | Barnes | Oct. 31, 1944 |